US012639986B2

(12) United States Patent
Gurr et al.

(10) Patent No.: US 12,639,986 B2
(45) Date of Patent: May 26, 2026

(54) DEVICE FOR IDENTIFYING OPERATING DATA OF A MOTOR-DRIVEN TOOL AND SYSTEM

(71) Applicant: Andreas Stihl AG & Co. KG, Waiblingen (DE)

(72) Inventors: Kay-Steffen Gurr, Heilbronn (DE); André Vaas, Jagstzell (DE); Cornelius Gindele, Plochingen (DE); Thomas Hilt, Winnenden (DE); Johannes Menzel, Wernau (DE); Uwe Fries, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 824 days.

(21) Appl. No.: 16/289,812

(22) Filed: Mar. 1, 2019

(65) Prior Publication Data

US 2019/0272683 A1 Sep. 5, 2019

(30) Foreign Application Priority Data

Mar. 2, 2018 (EP) .................................... 18159673

(51) Int. Cl.
*A01D 34/00* (2006.01)
*B25F 5/00* (2006.01)
(Continued)

(52) U.S. Cl.
CPC .................. *G07C 3/02* (2013.01); *B25F 5/00* (2013.01); *G07C 3/00* (2013.01); *G07C 7/00* (2013.01);
(Continued)

(58) Field of Classification Search
CPC .. H01M 50/20; H01M 50/216; H01M 50/572; H01M 50/293; A01D 34/006; G07C 5/008; G03G 15/80
(Continued)

(56) References Cited

U.S. PATENT DOCUMENTS 4,648,013 A * 3/1987 Curiel ................. H01M 50/227
362/183
5,233,296 A 8/1993 Maeda et al.
(Continued)

FOREIGN PATENT DOCUMENTS

CN 101751953 A 6/2010
CN 105983951 A 10/2016
(Continued)

OTHER PUBLICATIONS

German-language European Office Action issued in counterpart European Application No. 18159673.5 dated Aug. 24, 2018 (13 pages).
(Continued)

*Primary Examiner* — Shelley M Self
*Assistant Examiner* — Patrick B Fry
(74) *Attorney, Agent, or Firm* — Crowell & Moring LLP

(57) ABSTRACT

A device identifies operating data of a motor-driven tool. The device includes an identifying and/or evaluating device, an operating data memory unit, a communication interface, a housing, and an elastic element. The housing accommodates an electrical energy storage device and has an open and closed condition. In the open condition, the electrical energy storage device is insertable or removable. In the closed condition, the elastic element is configured to fix the electrical energy storage device by applying pressure along the insertion and removal direction of the energy storage device.

(Continued)

The force amounts to a value of the mass of the storage device multiplied by at minimum 1 N per g.

13 Claims, 4 Drawing Sheets

(51) Int. Cl.

| | | |
|---|---|---|
| *G07C 3/00* | (2006.01) | |
| *G07C 3/02* | (2006.01) | |
| *G07C 5/00* | (2006.01) | |
| *G07C 7/00* | (2006.01) | |
| *H01M 50/216* | (2021.01) | |
| *H02K 11/33* | (2016.01) | |

(52) U.S. Cl.
CPC . *H01M 50/216* (2021.01); *G05B 2219/37435* (2013.01); *H01M 2220/30* (2013.01); *H02K 11/33* (2016.01)

(58) Field of Classification Search
USPC .......................................... 429/163, 100, 162
See application file for complete search history.

(56) References Cited

U.S. PATENT DOCUMENTS

| | | | | |
|---|---|---|---|---|
| 5,262,232 | A | | 11/1993 | Wilfong et al. |
| 5,510,658 | A | | 4/1996 | Nakayama |
| 5,567,545 | A | * | 10/1996 | Murakami ............ H01M 50/20 |
| | | | | 429/163 |
| 5,691,037 | A | | 11/1997 | McCutcheon et al. |
| 5,724,431 | A | * | 3/1998 | Reiter .................. H04R 25/602 |
| | | | | 381/322 |
| 6,297,742 | B1 | | 10/2001 | Canada et al. |
| 7,185,998 | B2 | * | 3/2007 | Oomori ................... B25B 23/18 |
| | | | | 362/119 |
| 7,981,535 | B2 | * | 7/2011 | Scott ................... H01M 50/216 |
| | | | | 429/100 |
| 8,324,767 | B2 | | 12/2012 | Lee |
| 8,346,191 | B2 | * | 1/2013 | Robinson .............. H01M 50/50 |
| | | | | 455/115.1 |
| 10,185,279 | B1 | * | 1/2019 | Sadik ...................... G03G 15/75 |
| 10,685,299 | B2 | * | 6/2020 | Mejegard ............... H04W 4/80 |
| 2004/0225048 | A1 | * | 11/2004 | Miura ...................... C08K 5/13 |
| | | | | 524/323 |
| 2012/0171539 | A1 | * | 7/2012 | Rejman ................. H01M 50/24 |
| | | | | 429/99 |
| 2013/0022845 | A1 | | 1/2013 | Davis et al. |
| 2014/0070924 | A1 | | 3/2014 | Wenger et al. |
| 2014/0128710 | A1 | * | 5/2014 | Nakamura ............. G04G 17/08 |
| | | | | 429/100 |
| 2015/0081359 | A1 | * | 3/2015 | Mejegard ......... G06Q 10/06312 |
| | | | | 705/7.12 |
| 2016/0279782 | A1 | | 9/2016 | Ullrich et al. |

FOREIGN PATENT DOCUMENTS

| | | | |
|---|---|---|---|
| CN | 205863262 | U | 1/2017 |
| CN | 206040735 | U | 3/2017 |
| CN | 107294266 | A | 10/2017 |
| JP | 2-210662 | A | 8/1990 |
| JP | 7-31002 | A | 1/1995 |
| WO | WO 01/29783 | A2 | 4/2001 |
| WO | WO 2011/082226 | A2 | 7/2011 |
| WO | WO 2017/143767 | A1 | 8/2017 |

OTHER PUBLICATIONS

Stockwell, "Poron Foam Battery Compartment Pad / Battery Cushion," The Elastomerics Blog by Stockwell Elastomerics, Dec. 1, 2011 (2 pages).
Chinese-language Office Action issued in Chinese Application No. 201910156145.3 dated Apr. 25, 2021 (nine (9) pages).

\* cited by examiner

DEVICE FOR IDENTIFYING OPERATING DATA OF A MOTOR-DRIVEN TOOL AND SYSTEM

CROSS REFERENCE TO RELATED APPLICATION

This application claims priority under 35 U.S.C. § 119 from European Patent Application No. 18159673.5, filed Mar. 2, 2018, the entire disclosure of which is herein expressly incorporated by reference.

BACKGROUND AND SUMMARY OF THE INVENTION

The invention is based on the problem of providing a device for identifying operating data of a motor-driven tool, which device is reliable, and a system comprising a device of this kind and a motor-driven tool.

The invention solves this problem by way of providing a device and system for identifying operating data of a motor-driven tool in accordance with the claims herein.

The device according to the invention for identifying operating data of a motor-driven tool is configured for arrangement on, in particular in, the tool. The device comprises an identifying and/or evaluating device, an operating data memory, a communication interface, a housing and at least one elastic element. The identifying and/or evaluating device is configured to identify at least one, in particular physical, parameter, wherein the parameter is a function of an operating state of the tool, and to, in particular automatically, evaluate the identified parameter for obtaining the operating data. In addition or as an alternative, the identifying and/or evaluating device is configured to, in particular automatically, identify operating data. The operating data memory unit is configured to, in particular automatically, store the obtained and/or identified operating data. The communication interface is configured to, in particular automatically, transfer or send the stored operating data, in particular operating data stored in the operating data memory, to a terminal in a wire-less manner. The housing is configured to accommodate an electrical energy storage device for, in particular interruption-free, electrical energy supply of the identifying and/or evaluating device, the operating data memory unit and/or the communication interface. Furthermore, the housing has an open condition and a closed condition. In the open condition of the housing, the electrical energy storage device is insertable into the housing or removable from the housing, in particular by a user, along an insertion and removal direction. The at least one elastic element is configured, in the closed condition of the housing, to fix or to hold the accommodated electrical energy storage device, in particular in or in relation to the housing, in particular by direct contact, by applying pressure of a force along the insertion and removal direction. The force amounts to a value of the mass of the electrical energy storage device multiplied by at minimum 1 Newton (N) per gram (g), in particular at minimum 2.5 N/g, in particular at minimum 5 N/g, in particular at minimum 10 N/g, in particular at minimum 15 N/g, in particular at minimum 20 N/g, in particular at minimum 25 N/g, in particular at minimum 30 N/g.

The device and, respectively, its identifying and/or evaluating device, its operating data memory unit and its communication interface allow the operating data to be identified and transmitted.

Furthermore, the device or its housing, in the open condition, allows replacement or exchange of the energy storage device, in particular by the user, in particular if the energy storage device is empty.

In addition, the device or its elastic element, in particular in the closed condition of the housing, allows the accommodated energy storage device to be secured against vibrations or accelerations and therefore interruption-free electrical energy supply, in particular during operation of the tool. Therefore, the elastic element allows a vibration-resistant device.

Specifically, during operation of the motor-driven tool, relatively strong vibrations or accelerations can occur, in particular with a value of at minimum 100 times the normal acceleration due to gravity (G=9.80665 m/s²), in particular at minimum 250 G. Upon arrangement of the device on the tool, these accelerations can be, in particular mechanically, transmitted from the tool to the device or its housing. Up until now, this could lead to a movement of the accommodated energy storage device in the housing, in particular owing to possible play along the insertion and removal direction for allowing replacement, and therefore to an interruption in the electrical energy supply. Now, in the closed condition of the housing, the elastic element according to the invention can fix the accommodated energy storage device along the insertion and removal direction in such a way that, or according to the invention the minimum force can be selected to be so high that, a movement of the energy storage device along the insertion and removal direction can be avoided in the event of accelerations of typical values. That is to say: an, in particular axial, contact-pressure force can be greater than an acceleration force. Therefore, an interruption in the electrical energy supply can be avoided.

In other words: the elastic element can be configured, in the closed condition of the housing, to be compressed by the force along the insertion and removal direction by the accommodated energy storage device for fixing the energy storage device, in particular for compensating for any play.

In short: force F≥mass of the electrical energy storage device m (in g)×1 N/g. The 1 N/g can be designated the lower limit.

In addition, an upper limit can be provided. In particular, the value of the force can be the mass of the electrical energy storage device multiplied by at maximum 60 N/g, in particular at maximum 55 N/g, in particular at maximum 50 N/g, in particular at maximum 45 N/g, in particular at maximum 40 N/g, in particular at maximum 35 N/g, in particular at maximum 30 N/g.

In short: force F≤mass of the electrical energy storage device m (in g)×60 N/g. The 60 N/g can be designated the upper limit.

In particular, the device or its housing and its elastic element can be configured for the application of force to be able to be generated or produced, in particular to need to be applied, by or when closing the housing with the accommodated energy storage device.

This can allow or the maximum force can be selected to be so low that closing of the housing with the accommodated energy storage device, in particular against the force, is possible for the user.

In particular, the housing can be configured to be, in particular repeatedly and/or without destruction, changed between open and closed, in particular by the user.

In the open condition of the housing or without the energy storage device, a thickness of the elastic element along the insertion and removal direction can amount to a value of at minimum 1 millimetre (mm) and/or up to at maximum 6 mm, in particular of at minimum 1.5 mm and/or up to at maximum 5 mm, in particular from at minimum 2 mm and/or up to at maximum 4 mm, in particular 3 mm. In addition or as an alternative, a thickness of the elastic element along the insertion and removal direction in the closed condition of the housing or with the electrical energy storage device can amount to a value of at minimum 0.5 mm and/or up to at maximum 4 mm, in particular from at minimum 1 mm and/or up to at maximum 3 mm, in particular 2 mm. That is to say: in the closed condition of the housing or with the energy storage device, the elastic element can be pressed together along the insertion and removal direction by a value of at minimum 0.5 mm and/or up to at maximum 2 mm, in particular 1 mm.

In other words: the elastic element can have a spring constant with a value of the mass of the electrical energy storage device multiplied by at minimum 1 N/g*millimetre (mm), in particular up to at maximum 60 N/g*mm.

In particular, the elastic element can be configured to return to its original shape when the force disappears, in particular in the open condition of the housing or without an energy storage device.

The elastic element can be designated a buffer, in particular for compensating for any play. In addition or as an alternative, the elastic element can be different from the housing and/or the energy storage device. Further in addition or as an alternative, the elastic element can be disposed at least partially, in particular fully, in the or within the housing in the closed condition.

The housing can be rigid or have a considerably higher spring constant in comparison to the elastic element. In particular, the housing can include plastic such as poly-amides, in particular PA6-GF30, in particular can be made of plastic.

The device can be configured for, in particular mechani-cal, coupling to or attachment or fastening to, in particular in, the tool. In particular, the device can be configured for, in particular releasable, connection to the tool, in particular by a cohesive connection such as an adhesive bond, a force-fitting connection such as a latching or snap-action connection, and/or an interlocking connection such as a screw connection. The device can be disposed on, in par-ticular in, the tool, in particular be a portion of the tool. In addition or as an alternative, the device, upon arrangement on the tool, can be in direct contact with the tool, in particular a tool housing or a hood of the tool. Further in addition or as an alternative, the insertion and removal direction upon arrangement on the tool, in particular on the arrangement point, may not be parallel, in particular per-pendicular, to a surface of the tool.

The tool can have an electric drive motor or an internal combustion drive engine or can be driven by means of an electric motor or an internal combustion engine.

The identifying and/or evaluating device can be config-ured to identify the at least one parameter and/or the operating data in a wire-less manner, in particular without having an electrically conductive connection to the tool or components of the tool.

In particular, the identifying and/or evaluating device can have a sensor, wherein the sensor can be configured to identify at least one parameter. The parameter can be des-ignated a measurement parameter. In particular, the sensor can be disposed on, in particular in, the housing of the device. In addition or as an alternative, the sensor can be configured to be able to identify the parameter irrespective of whether the tool can be driven by means of an electric motor or an internal combustion engine. Therefore, param-eters and therefore also operating data for a large number of drive technologies such as internal combustion engine-driven, cabled, rechargeable battery-based, can be identified with the same device, without a wired connection to the tool or to components of the tool having to be required. In particular, the sensor can be an inductive sensor, such as at least one coil. Using the inductive sensor, it may be possible, in particular during operation of the tool, to detect changing electromagnetic and/or magnetic fields, in particular caused by stray fields of electric motors, ignition pulses of internal combustion engines, changes in current, moving magnets in a flywheel of the tool, a generator etc. Reference is also made to the relevant specialist literature in this respect.

In addition or as an alternative, the identifying and/or evaluating device can have or be a microcontroller.

Further in addition or as an alternative, the operating data can be an operating period of the tool, in particular during which the electric motor, if present, or the internal combus-tion engine, if present, can be active. It goes without saying that the operating data can be, in addition to the operating hours, also further tool operation-related data such as drive temperatures, drive powers, load data, tool user-related data, load states and/or voltage states of an energy storage device, sites of use, etc. Reference is also made to the relevant specialist literature in this respect.

The operating data memory unit can include or be a volatile memory, such as a RAM (Random Access Memory) and/or a non-volatile memory, such as a FLASH memory. Particularly when using a non-volatile memory, redundant memory methods can be used. Reference is also made to the relevant specialist literature in this respect.

The communication interface can have or be a WLAN interface and/or a Bluetooth interface. In addition or as an alternative, the communication interface can be configured to transmit irrespective of whether a terminal is in range or not. Reference is also made to the relevant specialist litera-ture in this respect.

The terminal can perform evaluations of the operating data, for example, based on the received operating data and present this to the user in optically processed form.

The supply with electrical energy can be designated electrical energy supply. In particular, the device can have electrical contact elements, wherein the contact elements can be configured to make electrical contact with corre-sponding electrical contacts of the accommodated energy storage device in the closed condition of the housing.

In particular, the device can exhibit voltage monitoring for a defined behaviour if dips in voltage or an interruption in supply should occur. In particular, the voltage monitoring can include or be brown-out detection. Reference is also made to the relevant specialist literature in this respect.

The device can also be designated an electrical device.

In one development of the invention, the device has an electrical energy storage device. In particular, the energy storage device can be an electrochemical energy storage device, in particular a battery. In addition or as an alterna-tive, an overall height of the energy storage device along the insertion and removal direction, in particular when accom-modated in the housing, can be smaller than a total diameter of the energy storage device radially or perpendicularly in relation to the insertion and removal direction. That is to say: the energy storage device can be a button cell. In particular, the energy storage device can be a CR 2032 button cell, in particular with a mass of 3 g, or a CR 2450 button cell, in particular with a mass of 6 g.

In one development of the invention, the force amounts to a value of at minimum 3 N, in particular of at minimum 7.5 N, in particular of at minimum 15 N, in particular of at minimum 30 N, in particular of at minimum 45 N, in particular of at minimum 60 N, in particular of at minimum 75 N, in particular of at minimum 90 N. In particular, this feature can replace the feature wherein the force amounts to a value of the mass of the energy storage device multiplied by at minimum 1 N/g. In addition, the force can amount to a value of at maximum 180 N, in particular of at maximum 165 N, in particular of at maximum 150 N, in particular of at maximum 135 N, in particular of at maximum 120 N, in particular of at maximum 105 N, in particular of at maximum 90 N. In other words: the elastic element can have a spring constant with a value of at minimum 3 N/mm up to at maximum 180 N/mm.

In one development of the invention, the elastic element can be configured, in the closed condition of the housing, to fix the accommodated electrical energy storage device by means of a flat contact. This allows surface-area transmission of the force between the elastic element and the energy storage device and/or compensation of unevennesses. In particular, flat contact can mean that contact can be established not only at an edge or ring, in particular of the elastic element or of the energy storage device, but also over a large portion of a surface area, in particular at least 50 percent (%) of the surface area, in particular at least 60%, in particular 70%, in particular 80%, in particular 90%, in particular 100%. A surface area and/or a diameter of the elastic element can correspond to a surface area and/or to a diameter of the energy storage device. In particular, the elastic element can be of flat configuration. In addition or as an alternative, the elastic element can have a cylindrical shape, in particular with a round cross-sectional form.

In one development of the invention, the elastic element includes a foam material, in particular the elastic element, in particular in its entirety, is a foam material. This allows a, in particular the, flat contact and/or a, in particular the, flat configuration and/or a relatively low overall height of the device or its housing and/or relatively cost-effective production of the elastic element and therefore of the device. In particular, the foam material can be understood to mean an artificially produced material with a cellular structure and a low density which can be compressed, in particular the volume of which can be considerably reduced by pressure. In other words: the elastic element can be a cellular elastomer.

In one development of the invention, the elastic element includes polyurethanes, in particular the elastic element, in particular in its entirety, is made of polyurethanes. This allows permanent elasticity of the elastic element. In particular, the housing can include a material which is different from the said polyurethanes, in particular can be made of a material which is different from the said polyurethanes.

In one development of the invention, the housing is configured or formed, in the closed condition of the housing, to secure the accommodated electrical energy storage device radially or perpendicularly, in particular against movement, in relation to the insertion and removal direction. In other words: the housing can be configured, in the closed condition, to fix or to hold the accommodated energy storage device radially in relation to the insertion and removal direction. The housing can be designated a radial guide or boundary. In particular, the housing, in particular on the inside, can be formed in a rotationally symmetrical manner around the insertion and removal direction. Play radially in relation to the insertion and removal direction does not need to be required.

In one development of the invention, the housing includes a container for accommodation of the electrical energy storage device and a cover, in particular which can be placed onto the container, for closing the container. In the open condition of the housing, the cover is removed from the container. In the closed condition of the housing, the cover seals the container, in particular in a fluid-tight manner. Furthermore, in the closed condition of the housing, the elastic element is disposed on the cover such that the elastic element applies a pressure on the accommodated electrical energy storage device against the container. In other words: in the closed condition of the housing, the elastic element can be disposed between the cover and the accommodated energy storage device, in particular along the insertion and removal direction. In particular, the elastic element can be connected to the cover, in particular in a cohesive manner. The container can be designated a tub. In particular, the container can be different from the cover. In the closed condition, the cover can be, in particular mechanically, connected to the container.

In one refinement of the invention, the container and the cover include at least one bayonet fitting for mechanical connection to each other, in particular in the closed condition of the housing. This allows a relatively low overall height of the device or its housing and/or allows the user to close the housing relatively easily.

In one development of the invention, the device is embodied separate from the tool. This allows retrofitting of the device to the tool. In particular, the device can be designated an appliance.

In one development of the invention, the device includes a damping element. Upon arrangement of the device on the tool, in particular a tool housing, the damping element is disposed between the housing and the tool, in particular the tool housing. This allows mechanical decoupling of the housing from the tool, in particular to reduce transmission of vibrations or accelerations from the tool to the housing and therefore to the accommodated energy storage device. In particular, a thickness of the damping element along the insertion and removal direction can amount to a value of at minimum 0.1 mm and/or up to at maximum 6 mm, in particular from at minimum 0.5 mm and/or up to at maximum 3 mm, in particular 1.5 mm. In addition or as an alternative, the damping element can be different from the housing and/or the tool and/or the elastic element. The damping element and the housing and/or the damping element and the tool can, in particular in each case, be in flat contact with each other or the damping element can be of flat configuration. Further in addition or as an alternative, the damping element can include a foam material, in particular can be a foam material. Further in addition or as an alternative, the elastic element can be connected to the housing, in particular in a cohesive manner. In addition, upon arrangement, the damping element can be connected to the tool, in particular in a cohesive manner. In particular, the damping element can be configured as a double-sided adhesive strip.

In one refinement of the invention, the damping element includes acrylate, in particular the damping element, in particular in its entirety, is made of acrylate. This allows particularly good damping or decoupling. In addition, acrylate can allow a cohesive connection, in particular an adhesive connection, to the housing and/or to the tool. In particular, the housing can include a material which is different from acrylate, in particular can be made of a material which is different from acrylate.

In one development of the invention, the device includes resilient electrical contact elements. The resilient electrical contact elements are configured, in the closed condition of the housing, to electrically contact corresponding electrical contacts, in particular contact areas, of the accommodated electrical energy storage device. The elastic element is different from the resilient electrical contact elements. This allows separation or decoupling of, in particular mechanical, fixing and electrical contacting of the energy storage device and therefore the elastic element and the contact elements can each be optimized for their task or function. That is to say: the contact elements do not need to make a contribution to fixing. In other words: the housing and the elastic element can be formed, in a manner corresponding to the energy storage device, such that the energy storage device, in the closed condition of the housing, can be held in position by means of the housing and the elastic element and does not need to be held in position by means of the contact elements. In particular, the resilient contact elements, on account of their spring tension, can, in the closed condition of the housing, be pressed against the corresponding contacts or contact areas in order to be able to implement electrical contacting with a low transfer resistance. However, here, the spring tension needs to serve only for optimum electrical contacting but not for fixing the energy storage device in the housing. In other words, the housing and the elastic element, on account of their shaping, can take on the function of fixing the energy storage device and the resilient contact elements can take on the function of electrical contacting. In addition or as an alternative, the contact elements can be guided out of the housing in order to there be electrically connected to corresponding connections, in particular on a printed circuit board.

The above-described device including all of its or some of its properties can be intended to be used with the motor-driven tool, in particular which can be driven by means of an electric motor and/or by means of an internal combustion engine for identifying operating data of the tool. In other words: use of the device for identifying operating data of the motor-driven tool, in particular which can be driven by means of an electric motor and/or by means of an internal combustion engine.

The system according to the invention includes an above-described device and a motor-driven tool. In particular, the tool can be configured partially or entirely as described above. In addition or as an alternative, the tool can be configured as a hand-guided, in particular hand-held or ground-guided, tool. Hand-guided, in particular hand-held, tool can mean that the tool can have a maximum mass of 50 kilograms (kg), in particular of 20 kg, in particular of 10 kg. Further in addition or as an alternative, the tool can be a gardening and/or forestry tool or soil working tool.

In one development of the invention, the motor-driven tool is a saw, or a pole-pruner, or hedge shears, or a hedge cutter, or a leaf blower, or a leaf aspirator, or a sweeper roller, or a sweeper brush, or a lawn mower, or a brush cutter, or a dethatcher.

In addition or as an alternative to the motor-driven tool, the system can include a terminal. In particular, the terminal can be any desired data processing device which can have a suitable wire-less interface which can be configured for wire-less communication with the communication interface of the device for identifying operating data. In addition or as an alternative, the terminal can form or be a gateway which can pass on the received operating data to a server, such as to a so-called cloud memory which can store the operating data. The operating data stored in the cloud memory can then be looked at and evaluated by means of a suitable tool, such as a web browser. In particular, the terminal can be a mobile terminal, such as a laptop, a tablet or a smartphone. Mobile can be referred to as portable or hand-guided, in particular hand-held.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 4 show a system 12 that includes a device 1 and a motor-driven tool 2.

Figure 4:
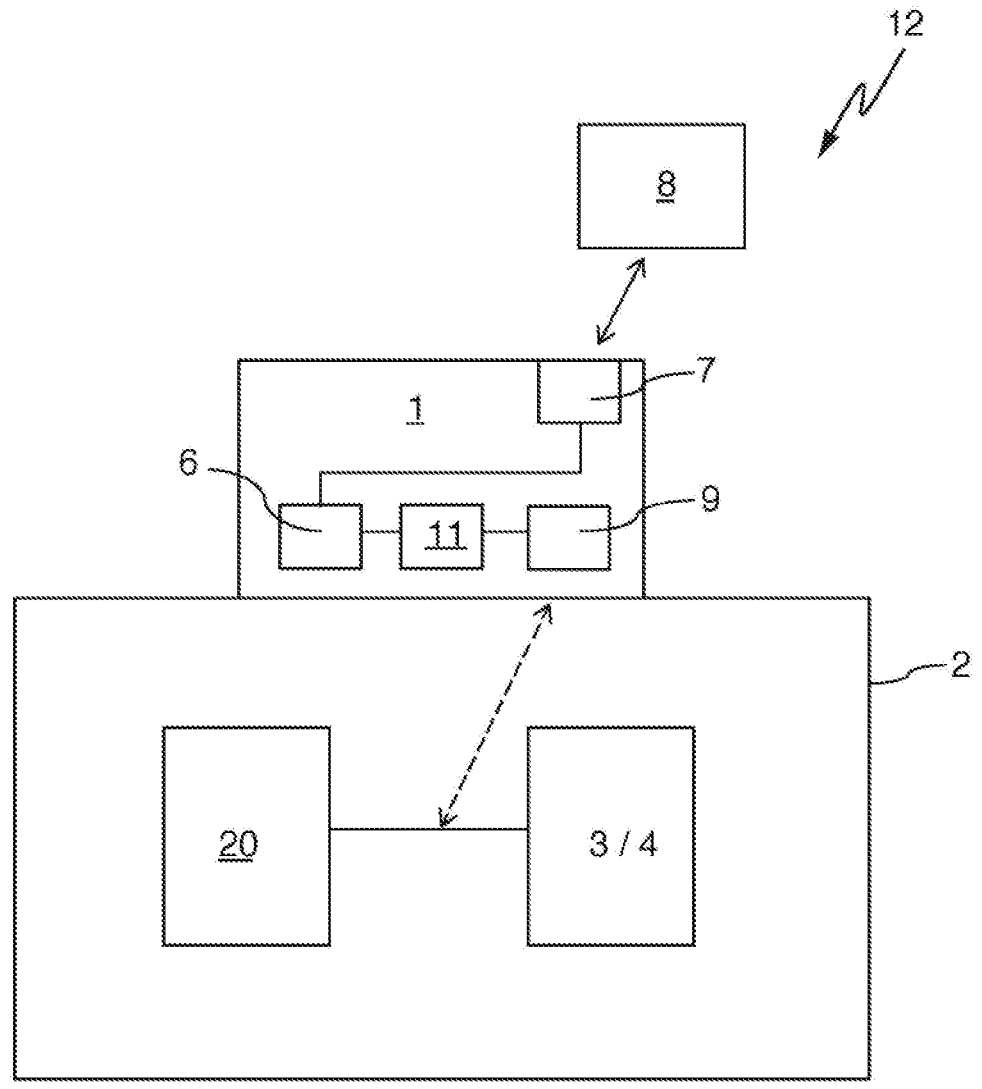
FIG. 4 shows a schematic block diagram of the system comprising the device of FIG. 1 and the tool of FIG. 3.

Specifically, the tool 2 includes an electric drive motor 3 or an internal combustion drive engine 4, as shown in FIG. 4.

Figure 3:
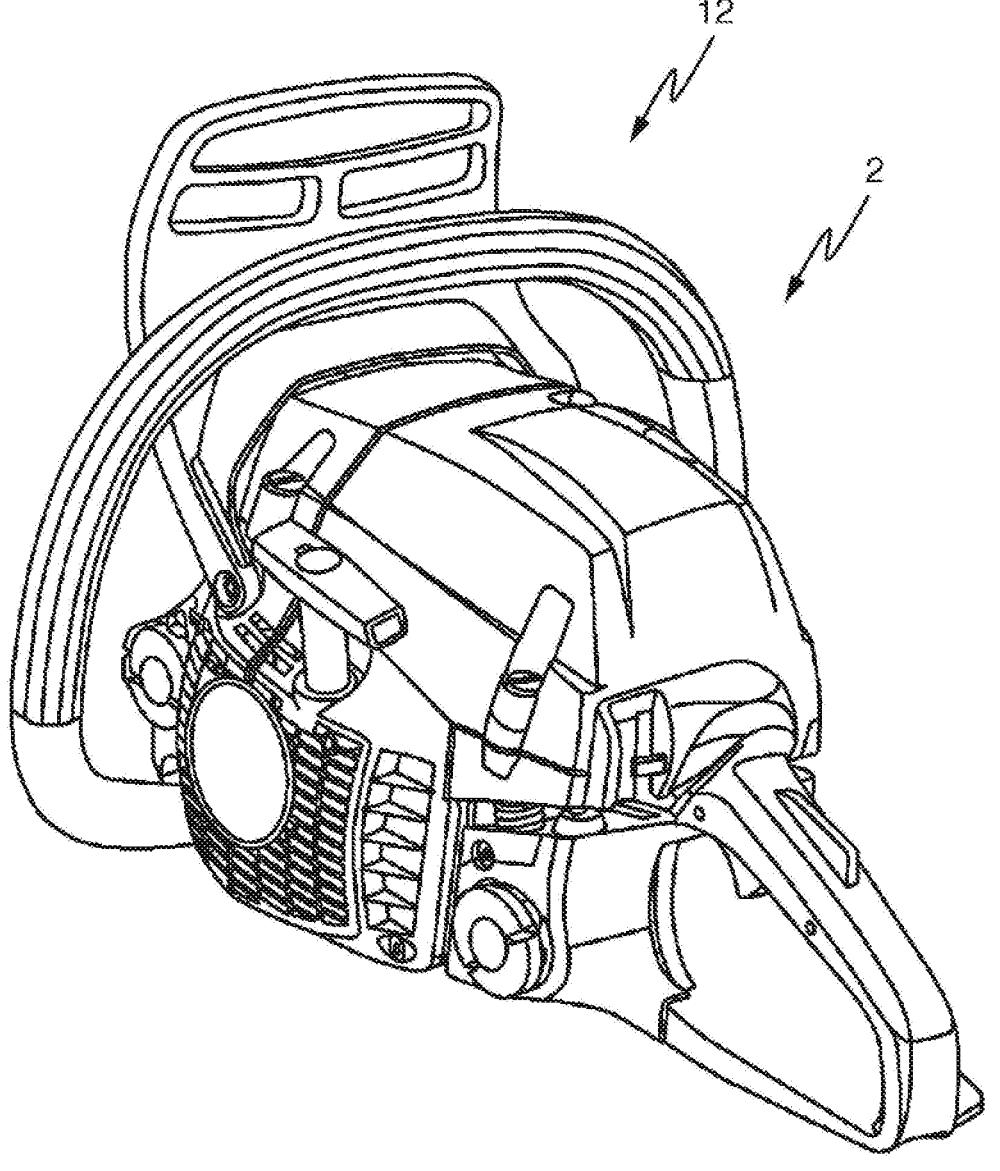
FIG. 3 shows a schematic perspective view of a section of a motor-driven tool of the system.

In the exemplary embodiment shown, the motor-driven tool 2 is a saw, as can be seen in FIG. 3. Specifically, the tool 2 has a saw chain 20, wherein in particular the electric drive motor 3 or the internal combustion drive motor 4 is configured for driving the saw chain 20. In alternative exemplary embodiments, the tool can be a pole-pruner, hedge shears, a hedge cutter, a leaf blower, a leaf aspirator, a sweeper roller, a sweeper brush, a lawn mower, a brush cutter, or a dethatcher.

In addition, the system 12 has a terminal 8.

Figure 1:
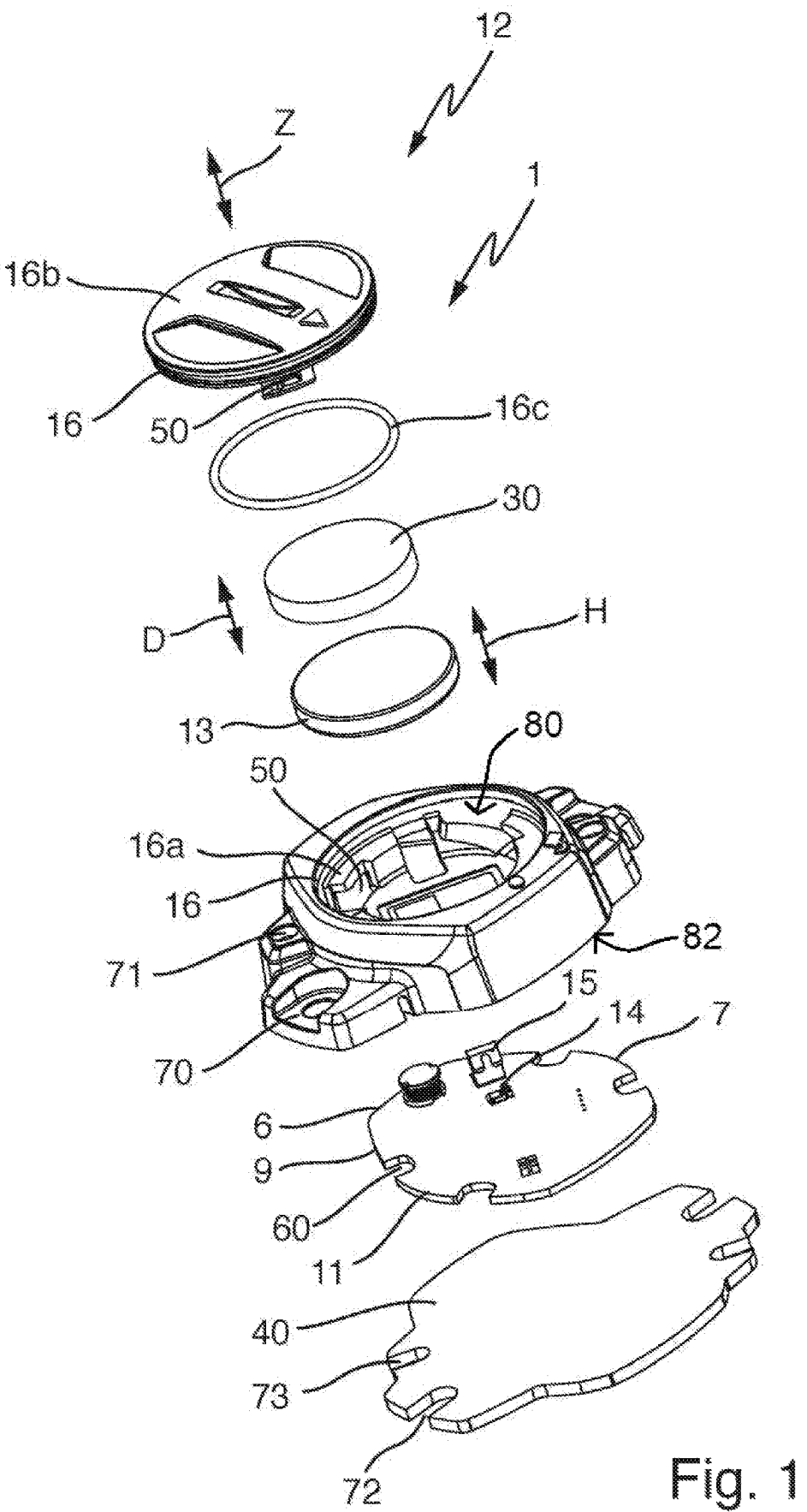
FIG. 1 shows a schematic exploded view of a device according to an embodiment of the invention of a system according to an embodiment of the invention.
Figure 2:
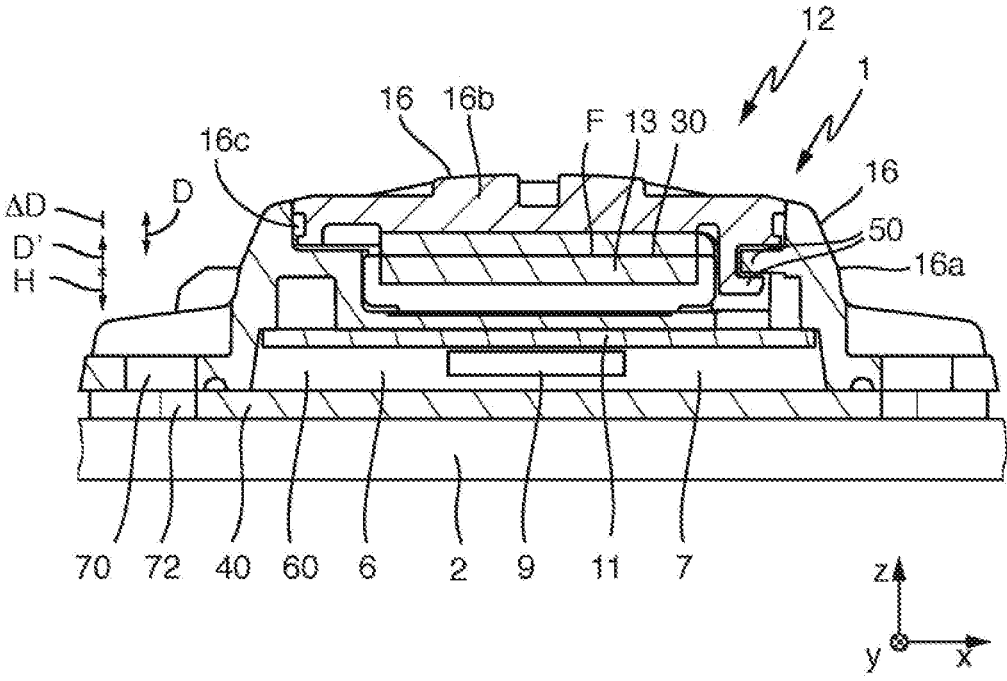
FIG. 2 shows a schematic view of a longitudinal section through the device of FIG. 1.

The device 1 is configured for identifying operating data of the motor-driven tool 2. Furthermore, the device 1 is configured for arrangement on the tool 2. In addition, the device 1 comprises an identifying and/or evaluating device 9, 11, an operating data memory 6, a communication interface 7, a housing 16 and at least one elastic element 30, as shown in FIGS. 1 and 2. The identifying and/or evaluating device 9, 11 is configured to identify at least one parameter, wherein the parameter is a function of an operating state of the tool 2, and to evaluate the identified parameter for obtaining the operating data. In addition or as an alternative, the identifying and/or evaluating device 9, 11 is configured to identify operating data. The operating data memory unit 6 is configured to store the obtained and/or identified operating data. The communication interface 7 is configured to transfer the stored operating data to the terminal 8 in a wire-less manner. The housing 16 is configured to accommodate an electrical energy storage device 13 for electrical energy supply of the identifying and/or evaluating device 9, 11, the operating data memory unit 6 and/or the communication interface 7. Furthermore, the housing 16 has an open condition and a closed condition. In the open condition of the housing 16, the electrical energy storage device 13 is insertable into the housing 16 or removable from the housing 16 through a top opening 80 along an insertion and removal direction z. The at least one elastic element 30 is configured, in the closed condition of the housing 16, to fix the accommodated electrical energy storage device 13 by applying pressure of a force F along the insertion and removal direction z. The force F amounts to a value of the mass m of the electrical energy storage device 13 multiplied by at minimum 1 N/g, and in particular at maximum 60 N/g.

In the exemplary embodiment shown, the identifying and/or evaluating device 9, 11 comprises an identifying part 9 in the form of a sensor and an evaluating part 11 in the form of a microcontroller, wherein the identifying part 9 and the evaluating part 11 exhibit an operative or signal connection with each other. In alternative exemplary embodiments, the identifying and/or evaluating device can be configured differently.

Furthermore, in the exemplary embodiment shown, the device 1 has only one single elastic element 30.

Specifically, the device 1 comprises the electrical energy storage device 13. In the exemplary embodiment shown, the energy storage device 13 is a CR 2032 button cell, in particular with an overall height H along the insertion and removal direction z of 3.2 mm. In alternative exemplary embodiments, the energy storage device can be a CR 2450 button cell, in particular with an overall height along the insertion and removal direction of 5.0 mm.

In the exemplary embodiment shown, the force F amounts to a value of 90 N. In alternative exemplary embodiments, the force can amount to a value of at minimum 3 N, and in particular of at maximum 180 N.

The elastic element 30 is configured, in the closed condition of the housing 16, to fix the accommodated electrical energy storage device 13 by means of a flat contact.

Furthermore, the elastic element 30 includes a foam material, in particular the elastic element 30 is a foam material.

In addition, the elastic element 30 includes polyurethanes, in particular the elastic element 30 is made of polyurethanes.

The housing 16 is configured, in the closed condition of the housing 16, to secure the accommodated electrical energy storage device 13 radially in relation to the insertion and removal direction z, in particular in directions x, y. In particular, the housing, in particular on the inside, is formed in a rotationally symmetrical manner around the insertion and removal direction z.

Furthermore, the housing 16 includes a container 16a for accommodation of the electrical energy storage device 13 and a cover 16b for closing the container 16a. In the open condition of the housing 16, the cover 16b is removed from the container 16a. In the closed condition of the housing 16, the cover 16b seals the container 16a. Furthermore, in the closed condition of the housing 16, the elastic element 30 is disposed on the cover 16b such that the elastic element 30 applies pressure on the accommodated electrical energy storage device 13 against the container 16a.

Specifically, in the open condition of the housing 16, in particular when the cover 16b is removed from the container 16a, the electrical energy storage device 13 is insertable into the container 16a or removable from the container 16a along the insertion and removal direction z.

In addition, the elastic element 30 is connected to the cover 16b, in particular in a cohesive manner by means of adhesive bonding.

The device 1 or its housing 16 or its cover 16b further includes a sealing ring 16c. In the closed condition of the housing 16, the cover 16b seals the container 16a by means of sealing ring 16c in a fluid-tight manner.

In addition, the container 16a and the cover 16b include at least one bayonet fitting 50 for mechanical connection to each other, in particular in the closed condition of the housing 16. In the exemplary embodiment shown, the container 16a and the cover 16b include three bayonet fittings 50. In alternative exemplary embodiments, the container and the cover can have only one, two or at least four bayonet fittings.

Furthermore, the device 1 includes resilient electrical contact elements 14, 15. There are two in the exemplary embodiment shown. The resilient electrical contact elements 14, 15 are configured, in the closed condition of the housing 16, to electrically contact corresponding electrical contacts of the accommodated electrical energy storage device 13. The elastic element 30 is different from the resilient electrical contact elements 14, 15.

In addition, the contact elements 14, 15 are guided out of the housing 16 or its container 16a to the outside and are electrically connected to corresponding connections, in particular on a printed circuit board 60 of the device 1.

Specifically, the printed circuit board 60 is disposed on a bottom side opening 82 of the housing 16 or its container 16a. In particular, the printed circuit board 60 is mechanically connected to the container 16a.

In the exemplary embodiment shown, the printed circuit board 60 comprises the identifying and/or evaluating device 9, 11, the operating data memory unit 6 and the communication interface 7.

In the open condition of the housing 16, in particular when the cover 16b is removed from the container 16a, or without the energy storage device 13, a thickness D of the elastic element 30 along the insertion and removal direction z is 3 mm.

When the energy storage device 13 is inserted into the housing 16 or its container 16a, the cover 16b has to be disposed on the container 16a or placed onto the container 16a in order to close the housing 16. The elastic element 30 and the accommodated energy storage device 13 are then in, in particular direct, flat contact with each other, in particular on a bottom side of the elastic element 30 and, respectively, a top side of the energy storage device 13. Furthermore, the housing 16 or its container 16a and the accommodated energy storage device 13 are in, in particular direct, flat contact with each other, in particular on a bottom side of the energy storage device 13, which bottom side is situated opposite or averted from the top side.

Furthermore, pressure has to be applied or pressing has to be performed in order to close the cover 16b in the direction of the container 16a. In this case, the elastic element 30 is compressed by the housing 16 or its cover 16b and its container 16a and the energy storage device 13 by the force F along the insertion and removal direction z.

In addition, cover 16b has to be rotated around the insertion and removal direction z in relation to the container 16a in order to mechanically connect or close the at least one bayonet fitting.

In the closed condition of the housing 16, in particular when the cover 16b seals the container 16a, a thickness D' of the elastic element 30 is 2 mm or the elastic element 30 is compressed by $\Delta D = 1$ mm along the insertion and removal direction z.

Therefore, in the closed condition of the housing 16, the accommodated energy storage device 13 is fixed, in particular at its top side and bottom side, by application of pressure of the force F along the insertion and removal direction z by the elastic element 30, in particular by means of the housing 16 or its cover 16b, and the housing 16 or its container 16a.

Furthermore, in the closed condition of the housing 16, the accommodated energy storage device 13 is secured, in particular at its lateral side which is disposed or situated between the top side and the bottom side, radially in relation to the insertion and removal direction z by the housing 16 or its container 16a and/or its cover 16b.

In addition, in the closed condition of the housing 16, the resilient electrical contact elements 14, 15 electrically contact corresponding electrical contacts of the accommodated energy storage device 13. Specifically, the contact element 14 contacts the bottom side of the energy storage device and the contact element 15 contacts the lateral side of the energy storage device 13.

The device 1 is further embodied separate from the tool 2.

In addition, the device 1 includes a damping element 40. Upon arrangement of the device 1 on the tool 2, the damping element 40 is disposed between the housing 16 and the tool 2. Specifically, a thickness of the damping element 40 along the insertion and removal direction z is 1.5 mm.

In the exemplary embodiment shown, the damping element 40 includes a foam material.

Specifically, the damping element 40 includes acrylate, in particular the damping element 40 is made of acrylate.

In the exemplary embodiment shown, the damping element 40, in particular a top side of the damping element 40, and the housing 16 or its container 16a, in particular its bottom side, and the damping element 40, in particular its top side, and the printed circuit board 60 are in each case in, in particular direct, flat contact with each other.

Specifically, the damping element 40 and the housing 16 or its container 16a and the damping element 40 and the printed circuit board 60 are in each case connected to each other, in particular in a cohesive manner by means of adhesive bonding.

Upon arrangement of the device 1 on the tool 2, the damping element 40, in particular a bottom side of the damping element 40 which is situated opposite to or averted from the top side, and the tool 2 are in, in particular direct, flat contact with each other.

Specifically, the damping element 40 and the tool 2 can be connected to each other, in particular in a cohesive manner by means of adhesive bonding.

In the exemplary embodiment shown, the damping element 40 is configured as a double-sided adhesive strip. When a protective film is removed from the bottom side of the damping element 40, the damping element 40 can be adhesively bonded to the tool 2 or stuck to the tool 2.

In addition, the device 1 or its housing 16 or its container 16a has at least one fastening element receptacle 70, 71 for a fastening element for fastening the device 1 to the tool 2. In the exemplary embodiment shown, the device 1 has four fastening element receptacles 70, 71. In alternative exemplary embodiments, the device can have only one single, two, three or at least five fastening element receptacles. The at least one fastening element can be a screw, a rivet or a cable tie.

The damping element has at least one fastening element bushing 72, 73, which corresponds to the at least one fastening element receptacle 70, 71, for the fastening element.

Upon arrangement, in particular fastening, of the device 1 on the tool 2 by means of the at least one fastening element receptacle 70, 71, the device 1 does not need to be connected to the tool 2 by means of cohesive connection. In other words: the protective film does not need to be removed from the damping element 40, in particular its bottom side.

In alternative exemplary embodiments, the device can be configured either for cohesive connection or for force-fitting connection or for interlocking connection to the tool. In addition or as an alternative, the device does not need to include the damping element.

Furthermore, upon arrangement of the device 1 on the tool 2, the insertion and removal direction z is not parallel, in particular perpendicular, to a surface of the tool 2.

In addition, the cover 16b, in particular in the closed condition of the housing 16, is disposed on a top side of the container 16a, which top side is situated opposite to or averted from the bottom side or an attachment side in particular.

As is clear from the exemplary embodiments shown and explained above, the invention provides a device for identifying operating data of a motor-driven tool, which device is reliable, in particular vibration-resistant, and a system comprising a device of this kind and a motor-driven tool.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for identifying operating data of a motor-driven tool, wherein the device is configured for arrangement on the tool, the device comprising:

an identifying and/or evaluating device, wherein the identifying and/or evaluating device is configured to identify at least one parameter, wherein the parameter is a function of an operating state of the tool, and to evaluate the identified parameter for obtaining the operating data and/or to identify operating data;

an operating data memory unit, wherein the operating data memory unit is configured to store the obtained and/or identified operating data;

a communication interface, wherein the communication interface is configured to transfer the stored operating data to a terminal in a wire-less manner;

a housing configured to be repeatedly and non-destructively opened and closed by a user; and at least one elastic element, wherein the housing is configured to accommodate an electrical energy storage device for electrical energy supply of the identifying and/or evaluating device, the operating data memory unit, and/or the communication interface, wherein the housing has an open condition and a closed condition, wherein, in the open condition of the housing, the electrical energy storage device is insertable into the housing or removable from the housing along an insertion and removal direction, wherein the at least one elastic element is configured, in the closed condition of the housing, to fix the accommodated electrical energy storage device by applying pressure of a force along the insertion and removal direction over a surface area of the electrical energy storage device facing the at least one elastic element, wherein the force amounts to a value of the mass of the electrical energy storage device multiplied by at minimum 1 N per g, and wherein the at least one elastic element includes or is made of at least one of a foam material and a polyurethane, the device further comprising:

a damping element, wherein upon arrangement of the device on the tool, the damping element is disposed between the housing and the tool; and at least two resilient electrical contact elements, wherein the at least two resilient electrical contact elements are configured, in the closed condition of the housing, to electrically contact corresponding electrical contacts of the accommodated electrical energy storage device with a spring tension that is not needed to contribute to fixing the electrical energy storage device in the housing, and the at least one elastic element is different from the at least two resilient electrical contact elements.

2. The device according to claim 1, further comprising: an electrical energy storage device.

3. The device according to claim 1, wherein the force amounts to a value of either: at minimum 3 N, at minimum 7.5 N, at minimum 15 N, at minimum 30 N, at minimum 45 N, at minimum 60 N, at minimum 75 N, or at minimum 90 N.

4. The device according to claim 1, wherein the elastic element is configured, in the closed condition of the housing, to fix the accommodated electrical energy storage device by way of flat contact.

5. The device according to claim 1, wherein the housing is configured, in the closed condition of the housing, to secure the accommodated electrical energy storage device radially in relation to the insertion and removal direction.

6. The device according to claim 1, wherein the housing includes a container for accommodation of the electrical energy storage device and a cover for closing the container, in the open condition of the housing, the cover is removed from the container and, in the closed condition of the housing, the cover seals the container, and in the closed condition of the housing, the elastic element is disposed on the cover such that the elastic element applies a pressure on the accommodated electrical energy storage device against the container.

7. The device according to claim 6, wherein the container and the cover include at least one bayonet fitting for mechanical connection to each other.

8. The device according to claim 1, wherein the device is embodied separate from the tool.

9. The device according to claim 1, wherein the damping element includes or is made of acrylate.

10. The device according to claim 1, wherein the elastic element is non-conductive.

11. A system, comprising:

a device according to claim 1, and a motor-driven tool.

12. The system according to claim 11, wherein the motor-driven tool is a saw, a pole-pruner, hedge shears, a hedge cutter, a leaf blower, a leaf aspirator, a sweeper roller, a sweeper brush, a lawn mower, a brush cutter, or a dethatcher.

13. A device for identifying operating data of a motor-driven tool, wherein the device is configured for arrangement on the tool, the device comprising:

an identifying and/or evaluating device, wherein the identifying and/or evaluating device is configured to identify at least one parameter, wherein the parameter is a function of an operating state of the tool, and to evaluate the identified parameter for obtaining the operating data and/or to identify operating data;

an operating data memory unit, wherein the operating data memory unit is configured to store the obtained and/or identified operating data;

a communication interface, wherein the communication interface is configured to transfer the stored operating data to a terminal in a wire-less manner;

a housing configured to be repeatedly and non-destructively opened and closed by a user;

at least one elastic element, wherein the housing comprises a housing container body having top and bottom openings, the housing container body being configured to accommodate an electrical energy storage device through the top opening for electrical energy supply of the identifying and/or evaluating device, the operating data memory unit, and/or the communication interface, and being configured to accommodate the identifying and/or evaluating device, the operating data memory unit, and/or the communication interface through the bottom opening, wherein a portion of the housing container body is interposed between the electrical energy storage device from the identifying and/or evaluating device, the operating data memory unit, and/or the communication interface, wherein the housing has an open condition and a closed condition, wherein, in the open condition of the housing, the electrical energy storage device is insertable into the housing or removable from the housing through the top opening along an insertion and removal direction, wherein the at least one elastic element is configured, in the closed condition of the housing, to fix the accommodated electrical energy storage device by applying pressure of a force along the insertion and removal direction over a surface area of the electrical energy storage device facing the at least one elastic element, wherein the elastic element applies the pressure on the accommodated electrical energy storage device against the portion of the housing container body interposed between the electrical energy storage device and the identifying and/or evaluating device, the operating data memory unit, and/or the communication interface, wherein the force amounts to a value of the mass of the electrical energy storage device multiplied by at minimum 1 N per g.

* * * * *